: 3,123,607
Patented Mar. 3, 1964

3,123,607
RECOVERY OF DIAZABICYCLO-OCTANE
Adalbert Farkas, Media, and Merwin D. Oakes, Green Ridge, Pa., assignors to Air Products and Chemicals, Inc., a corporation of Delaware
No Drawing. Filed May 9, 1958, Ser. No. 734,094
2 Claims. (Cl. 260—268)

This invention is concerned with the recovery of 1,4-diazabicyclo-(2.2.2)-octane, sometimes referred to as triethylene diamine, from reaction products and the like containing the same. It is particularly concerned with improvement in the methods of separation and recovery of initially higher yields from such products.

Recently, see co-pending application Serial No. 628,723, filed December 17, 1956, now U.S. Patent No. 2,937,176, for Preparation of Diazabicyclo-Octane, methods have been developed for the preparation of 1,4-diazabicyclo-(2.2.2)-octane in substantially higher and in practical yields by the vapor phase reaction of alkylene polyamines, particularly diethylene triamine, over solid acidic catalyst at temperatures in the range of about 300–500° C. The amount of 1,4-diazobicyclo-(2.2.2)-octane in the product of such reaction substantially exceeds anything previously available but is still in admixture with by-products and unconverted charge present in such amount that the separation and recovery of the 1,4-diazabicyclo-(2.2.2)-octane therefrom is a matter of considerable interest and high importance.

In addition to relatively large amounts of unconverted charge, one of the by-products, namely piperazine, is present in the reaction product in an amount generally about the same as the quantity of 1,4-diazabicyclo-(2.2.2)-octane. Separation and recovery of 1,4-diazabicyclo-(2.2.2)-octane from such product stream is possible to a reasonable degree with previously available means with the ultimate recovery of high purity product. One such method of separation and recovery is described in detail in the above identified co-pending application. However, it has been found that because of certain properties inherent in the reaction mixture, particularly with the piperazine and the 1,4-diazabicyclo-(2.2.2)-octane in admixture, the separation of these two materials by distillation, even precise distillation with a multi-plate high reflux type still, is such that to achieve a fraction containing substantial amounts of 1,4-diazobicyclo-(2.2.2)-octane free of piperazine, an appreciable amount of the 1,4-diazabicyclo-(2.2.2)-octane is distilled earlier and is associated with the so-called piperazine fraction. Thus a substantial amount of the potential quantity of recoverable 1,4-diazabicyclo-(2.2.2)-octane is lost by its inclusion in the piperazine fraction. It is likewise to be noted that where separation and purification of piperazine is of importance, the contamination of such piperazine fraction by substantial quantities of 1,4-diazabicyclo-(2.2.2)-octane is an objectionable and an unsatisfactory condition.

It has now been found that the separation of the piperazine and 1,4-diazabicyclo-(2.2.2)-octane from the product stream containing the same is substantially improved by the distillation procedure set forth hereinafter. Likewise, it is found that the separation of piperazine and 1,4-diazabicyclo-(2.2.2)-octane into fractions each relatively free of the other is likewise effected.

In accordance with the invention, the separation and purification of 1,4-diazabicyclo-(2.2.2)-octane from mixtures containing other nitrogenous compounds including piperazine is effected by distilling such a mixture in the presence of an added stable inert component taken from the group consisting of water insoluble organic compounds boiling in the range of about 135° C. to about 180° C. and including alkyl aromatic hydrocarbons, esters of aromatic and aliphatic carboxy acids, and halogenated aromatic and aliphatic hydrocarbons. A distillate boiling in the range of approximately 160–195° C., containing substantially all of the 1,4-diazabicyclo-(2.2.2)-octane originally present, is separated and recovered. Substantially pure 1,4-diazabicyclo-(2.2.2)-octane may then be recovered from such fraction by cooling the distillate and recovering the formed crystals of 1,4-diazabicyclo-(2.2.2)-octane. In a preferred form of the invention the distillation is effected in such a manner that material boiling to about 130° C. is first removed and the added stable inert component is then introduced into the residual material for further distillation which thereafter proceeds in similar fashion. It is found that in the presence of such additives the distillation can be effected to at least 150° C. and preferably to about 160–165° C. so that the piperazine and the additive may be substantially completely separated relatively free of 1,4-diazabicyclo-(2.2.2)-octane present in the distilland, and that the distillation continued further permits the separation of the distillate overhead comprising at least 80% of the 1,4-diazabicyclo-(2.2.2)-octane relatively free of any piperazine and the previously added agent. Thus, the separation of piperazine from 1,4-diazabicyclo-(2.2.2)-octane present in the charge to distillation also is improved in a manner heretofore not available.

Subsequent treatment of the distillate fraction containing substantially all of the 1,4-diazabicyclo-(2.2.2)-octane thereafter can be effected to recover high yield of high purity diethylene triamine. One such method involves the cooling of the distillate fraction to a temperature in the range of about 0–40° C. and preferably to a temperature in the range of 15–25° C. whereupon the 1,4-diazabicyclo-(2.2.2)-octane selectively crystallizes in substantially pure form and in high concentrations of the 1,4-diazabicyclo-(2.2.2)-octane present in such fraction. Subsequent separation of the formed crystals with the freeing therefrom of occluded mother liquor and the like, as by washing with solvent selective for occluded materials but in which the crystalline 1,4-diazabicyclo-(2.2.2)-octane is substantially insoluble, gives a high yield of 1,4-diazabicyclo-(2.2.2)-octane having a purity above 90%. Such selective solvents include the saturated hydrocarbons of the $C_4$–$C_6$ range. Pentane is a particularly effective solvent for such washing. The mother liquor and solvent washings from which such 1,4-diazabicyclo-(2.2.2)-octane crystals are separated still contain appreciable quantities of 1,4-diazabicyclo-(2.2.2)-octane. The recovery of most of this 1,4-diazabicyclo-(2.2.2)-octane can be effected by the reuse of the mother liquor for further crystallizing or for recycle to some other selected stage of operation, or other typical methods for further recovery.

Another procedure which may be followed for the separation of very pure 1,4-diazabicyclo-(2.2.2)-octane is that of redistilling the fraction recovered in the range of 165–195° C. and separating therefrom a "heart cut" boiling in the range of about 168–175° C. which contains high concentrations of the 1,4-diazabicyclo-(2.2.2)-octane present in such fraction and selectively crystallizing therefrom a high yield of very pure 1,4-diazabicyclo-(2.2.2)-octane.

The additives which make this procedure effective are those mentioned above comprising one or more of the groups of water-insoluble organic compounds boiling in the range of about 135° to about 180° C. and including alkyl aromatic hydrocarbons, esters of aromatic and aliphatic carboxy acids, and chlorinated aliphatic and aromatic hydrocarbons. Particularly effective additive components are alkyl aromatics, preferably cumene and xylene in which piperazine has relatively low solubility at room temperature and below. Examples of esters and chlorinated hydrocarbons in the described boiling range are: chlorotoluene, dichlorobenzenes, various polychloropentanes such as 2:3 dichloropentane, amyl acetate, etc. These additives are not necessarily of equal effectiveness in the degree of improvement. These materials are added in an amount equivalent to about 30 to 100% by weight of the piperazine-1,4-diazabicyclo-(2.2.2)-octane-containing mixture charged to distillation, and are added, preferably to the material remaining after distillation removal of the fraction boiling to about 130° C.

It is to be understood that reduced pressure may be employed for the distillation operation. When pressure below atmospheric is used the cut temperatures of the several fractions will be lower in accord with well established information based on vapor pressure-temperature relationship.

The following information is an example of the effectiveness of this type of operation.

|  | A<br>With<br>Additive | B<br>Without<br>Additive |
|---|---|---|
| Reaction Product, (by analysis): |  |  |
| Piperazine, wt. percent | 17.9 | 15.5 |
| 1,4-diazabicyclo-(2.2.2)-octane, wt. percent | 14.0 | 13.9 |
| Distillation, Fraction: |  |  |
| Int. to 130° C.— |  |  |
| Percent 1,4-diazabicyclo-(2.2.2)-octane (in fraction) | 0.7 | 0 |
| Percent Piperazine (in fraction) | 5.9 | 4.2 |
| 130° to 165° C.— |  |  |
| Percent 1,4-diazabicyclo-(2.2.2)-octane (in fraction) | ¹0.4 | 24.0 |
| Percent Piperazine (in fraction) | 10.2 | 29.0 |
| 165° to 195° C.— |  |  |
| Percent 1,4-diazabicyclo-(2.2.2)-octane (in fraction) | ²56.1 | ³56.0 |
| Percent Piperazine (in fraction) | 3.8 | 2.7 |

¹ Xylene 100 wt. percent, added before recovery of this fraction.
² Equivalent to 89.8% of 1,4-diazabicyclo-(2.2.2)-octane present in charge to distillation.
³ Equivalent to 48% of 1,4-diazabicyclo-(2.2.2)-octane present in charge to distillation.

After cooling the 165 to 195° C. fraction of A to about 20° C. there were recovered 1,4-diazabicyclo-(2.2.2)-octane crystals of about 90.5% purity in an amount of 72.5% of the 1,4-diazabicyclo-(2.2.2)-octane originally present.

After cooling the 165 to 195° C. fraction of B similarly, the recovered 1,4-diazabicyclo-(2.2.2)-octane crystals of 90% purity amounted to about 30% of the 1,4-diazabicyclo-(2.2.2)-octane present originally, indicating substantially poorer quantative separation and recovery.

Obviously many modifications and variations of the invention as hereinbefore set forth may be made without departing from the spirit and scope thereof, and therefore only such limitations should be imposed as are indicated in the appended claims.

What is claimed is:

1. The method for the separation and purification of 1,4-diazabicyclo-(2.2.2)-octane, prepared by passing alkylene-polyamine having 2 to 10 carbon atoms in vapor phase over a solid acidic cracking catalyst at a temperature in the range of about 300 to 500° C., from nitrogenous by-products of the same reaction which consists essentially of: distilling the mixture obtained from said reaction; recovering the overhead fraction boiling up to about 130° C.; adding 30 to 100% by weight of an alkyl aromatic hydrocarbon boiling in the range from about 135° C. to about 180° C.; continuing the distillation; separating and recovering the fraction boiling in the range of 165 to 195° C.; cooling said fraction boiling in the range of 165 to 195° C. to between 0 to 40° C. to thereby selectively crystallize 1,4-diazabicyclo-(2.2.2)-octane present in said fraction; washing the crystals of 1,4-diazabicyclo-(2.2.2)-octane with pentane and thereafter recovering purified 1,4-diazabicyclo-(2.2.2)-octane.

2. The method for the separation and purification of 1,4-diazabicyclo-(2.2.2)-octane, prepared by passing an alkylene-polyamine having 2 to 10 carbon atoms in vapor phase over a solid acidic cracking catalyst at a temperature in the range of about 300 to 500° C., from nitrogenous by-products of the same reaction which consists essentially of: distilling the mixture obtained from said reaction; removing the overhead fraction boiling below about 130° C.; adding 30 to 100% by weight of an alkyl aromatic hydrocarbon boiling in the range of about 135° C. to about 180° C.; continuing the distillation; separating and recovering the fraction boiling in the range of 165 to 195° C.; redistilling said fraction boiling in the range of 165 to 195° C.; recovering a heart cut fraction from the redistilled material boiling in the range of 168 to 175° C.; cooling said heart cut fraction to between 0 to 40° C. to thereby selectively crystallize 1,4-diazabicyclo-(2.2.2)-octane present in this fraction; washing the crystals of 1,4-diazabicyclo-(2.2.2)-octane with pentane and thereafter recovering purified 1,4-diazabicyclo-2.2.2)-octane.

References Cited in the file of this patent
UNITED STATES PATENTS
2,937,176    Herrick _____ May 17, 1960